US008661072B2

(12) United States Patent  
Blaner et al.

(10) Patent No.: US 8,661,072 B2  
(45) Date of Patent: Feb. 25, 2014

(54) SHARED PARALLEL ADDER TREE FOR EXECUTING MULTIPLE DIFFERENT POPULATION COUNT OPERATIONS

(75) Inventors: Bartholomew Blaner, Underhill Center, VT (US); Todd R. Iglehart, Durham, NC (US); Robert K. Montoye, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1295 days.

(21) Appl. No.: 12/193,782

(22) Filed: Aug. 19, 2008

(65) Prior Publication Data

US 2010/0049779 A1    Feb. 25, 2010

(51) Int. Cl.  
*G06F 7/50* (2006.01)

(52) U.S. Cl.  
USPC ........... 708/670; 708/629; 708/708; 708/630; 708/709

(58) Field of Classification Search  
USPC .......................................... 708/670, 708, 629  
See application file for complete search history.

(56) References Cited

U.S. PATENT DOCUMENTS

| | | | |
|---|---|---|---|
| 4,498,177 A | | 2/1985 | Larson |
| 5,541,865 A * | | 7/1996 | Ashkenazi .................... 708/210 |
| 5,717,616 A * | | 2/1998 | Morris ........................... 708/210 |
| 5,726,927 A * | | 3/1998 | Wolrich et al. ............... 708/620 |
| 5,734,599 A * | | 3/1998 | Lee et al. ...................... 708/620 |
| 6,438,182 B1 | | 8/2002 | Olaker et al. |
| 6,795,839 B2 | | 9/2004 | Karim et al. |
| 7,353,364 B1 * | | 4/2008 | Chong et al. .................. 712/215 |
| 2002/0095450 A1 | | 7/2002 | Karim et al. |
| 2009/0019100 A1 * | | 1/2009 | Moyer et al. ................. 708/210 |

FOREIGN PATENT DOCUMENTS

| | | |
|---|---|---|
| JP | 2206827 | 8/1990 |
| JP | 3271929 | 12/1991 |
| WO | 2007093336 A1 | 8/2007 |

OTHER PUBLICATIONS

"Carry Save Adder Trees in Multipliers" ecen 6 2 6 3 advanced vlsi design Nov. 3, 1999.*  
Jha, Niraj K., "Testing of Differential Cascode Voltage Switch One-Count Generators", IEEE Journal of Solid-State Circuits, Feb. 1990, p. 246-253, vol. 25, No. 1.

* cited by examiner

*Primary Examiner* — Chat Do  
*Assistant Examiner* — Jae Jeon  
(74) *Attorney, Agent, or Firm* — Cantor Colburn LLP; Michael LeStrange

(57) ABSTRACT

A shared parallel adder tree for executing multiple different population count operations on a single datum includes a number of carry-save adders (CSAs) and/or half adders (HAs), arranged in rows, where certain CSAs and HAs are dedicated to a single population count operation, while other CSAs and HAs are shared among two or more population count operations. The datum is applied to the first row in the tree. Partial sums of the number of ones at various locations within the tree are routed to certain CSAs and/or HAs "down" the tree to propagate the particular population count operations. Carry-propagate adders generate at least a portion of the final sum of the number of ones in certain population count operations. An "AND" operation on a particular number of the bits in the datum provides the high order bit of the resulting sum of the particular population count operation.

19 Claims, 10 Drawing Sheets

SHARED PARALLEL ADDER TREE FOR EXECUTING MULTIPLE DIFFERENT POPULATION COUNT OPERATIONS

BACKGROUND

The present invention relates generally to computer microarchitecture designs, and, more particularly, to a shared parallel adder tree for executing multiple different population count operations on a single datum.

One common task in digital computing is to count the number of binary "1"s in a string or packet of bits (i.e., "datum"). Such population count operations are important for various digital applications, including communication, encryption, decryption, voice recognition, encoding and many others. It is also important that the population count operations take place at a relatively fast rate, so as to not undesirably slow down the entire digital computing system.

Known population counters are implemented with carry-save adder (CSA) devices arranged in a tree configuration. Carry-save adders are used instead of full adders also common in prior art population counters. This is because CSAs are much faster than full adders as CSAs do not propagate the carries throughout the entire instruction execution as full adders do. Propagating the carries with full adders adds a relatively large amount of time for the entire instruction to execute. In contrast, a CSA stores the carry as a separate part of the binary output value of the CSA, with the other part of the binary output value of a CSA being the partial sum. This allows some computer microarchitecture designs to execute a population count instruction in a single CPU cycle.

However, as computers trend towards increasingly wider data widths (e.g., 64 bits versus 32 bits), designing the corresponding computer microarchitecture on the microchip or integrated circuit (IC) to achieve the desired fast speeds of instruction execution is becoming increasingly difficult and challenging. Also, with the wider data word widths it is desired to perform population count operations not only on the entire 64-bit word, but also on portions of the entire word (i.e., on smaller bit-words, for example, 8, 16 or 32 bit sub-words). Typically, it has been necessary to design a separate or dedicated parallel adder tree into the computer microarchitecture for each desired population count operation. That is, a parallel adder tree is not "shared" by the different population count operations. This leads to an inefficient usage of the microchip area.

What is needed is single parallel adder tree that allows portions of the tree, or "subtrees", to be shared in order to perform or execute multiple, different population count operations on a single datum, thereby providing for a relatively smaller area on the microchip to be taken up by the population count circuitry, faster operation in carrying out the multiple population count operations, and overall relatively lower power usage by the microchip.

SUMMARY

The foregoing discussed drawbacks and deficiencies of the prior art are overcome or alleviated, in an exemplary embodiment, by a single, shared parallel adder tree for executing multiple different population count operations or instructions for counting the number of ones in a particular datum. In an exemplary embodiment, the single tree includes a number of carry-save adders (CSAs) and also, in some rows, half adders (HAs), arranged in rows, where certain CSAs and HAs are dedicated to a single specific one of the population count operations, while other CSAs and HAs are shared among two or more specific population count operations. The original datum or operand is applied to the first row of CSAs and HAs in the tree. Resulting partial sums of the number of ones at various locations within the shared tree are routed to certain CSAs and, where used, HAs, in other rows "down" the tree to continue the simultaneous propagation of the particular different population count operations. Carry-propagate adders (CPAs) are used to generate at least a portion of the final sum of the number of ones in certain population count operations.

In a further aspect of the present invention, certain one or more of the population count operations include an "ANDing" of a particular number of the bits in the original datum whose ones are being counted by the shared parallel tree of the present invention. This "sum-bit-set" detection operation provides the high order bit of the resulting sum of the particular population count operation. The AND operation reduces the delay of the CPA used to generate at least a portion of the final sum of the number of ones. The CPA delay is reduced in this manner by one carry stage. This ANDing operation preferably occurs in parallel with the operation of the CPA, essentially speeding up the final CPA sum operation in the tree.

BRIEF DESCRIPTION OF THE DRAWINGS

Referring to the exemplary drawings wherein like elements are numbered alike in the several Figures:

FIG. 1, including FIGS. 1A-1D, is a block diagram of an exemplary embodiment of a first portion of a single, shared parallel adder tree for executing multiple different population count operations or instructions for counting the number of ones in a particular datum; and FIG. 2, including FIGS. 2A-2F, is a block diagram of a second portion of the exemplary embodiment of the shared parallel adder tree of FIG. 1.

DETAILED DESCRIPTION

Disclosed herein is a shared parallel adder tree for executing multiple different population count operations on a single datum. Briefly stated, the single tree includes a number of carry-save adders (CSAs) and also, in some rows, half adders (HAs), arranged in rows, where certain CSAs and HAs are dedicated to a single specific one of the population count operations, while other CSAs and HAs are shared among two or more specific population count operations. The original datum or operand is applied to the first row of CSAs and HAs in the tree. Resulting partial sums of the number of ones at various locations within the shared tree are routed to certain rows of CSAs and, where used, HAs, "down" the tree to continue the propagation of the particular population count operations. Carry-propagate adders (CPAs) are used to generate at least a portion of the final sum of the number of ones in certain population count operations. An "AND" operation on a particular number of the bits in the original datum provides the high order bit of the resulting sum of the corresponding particular population count operation.

Figures 1, 1A:
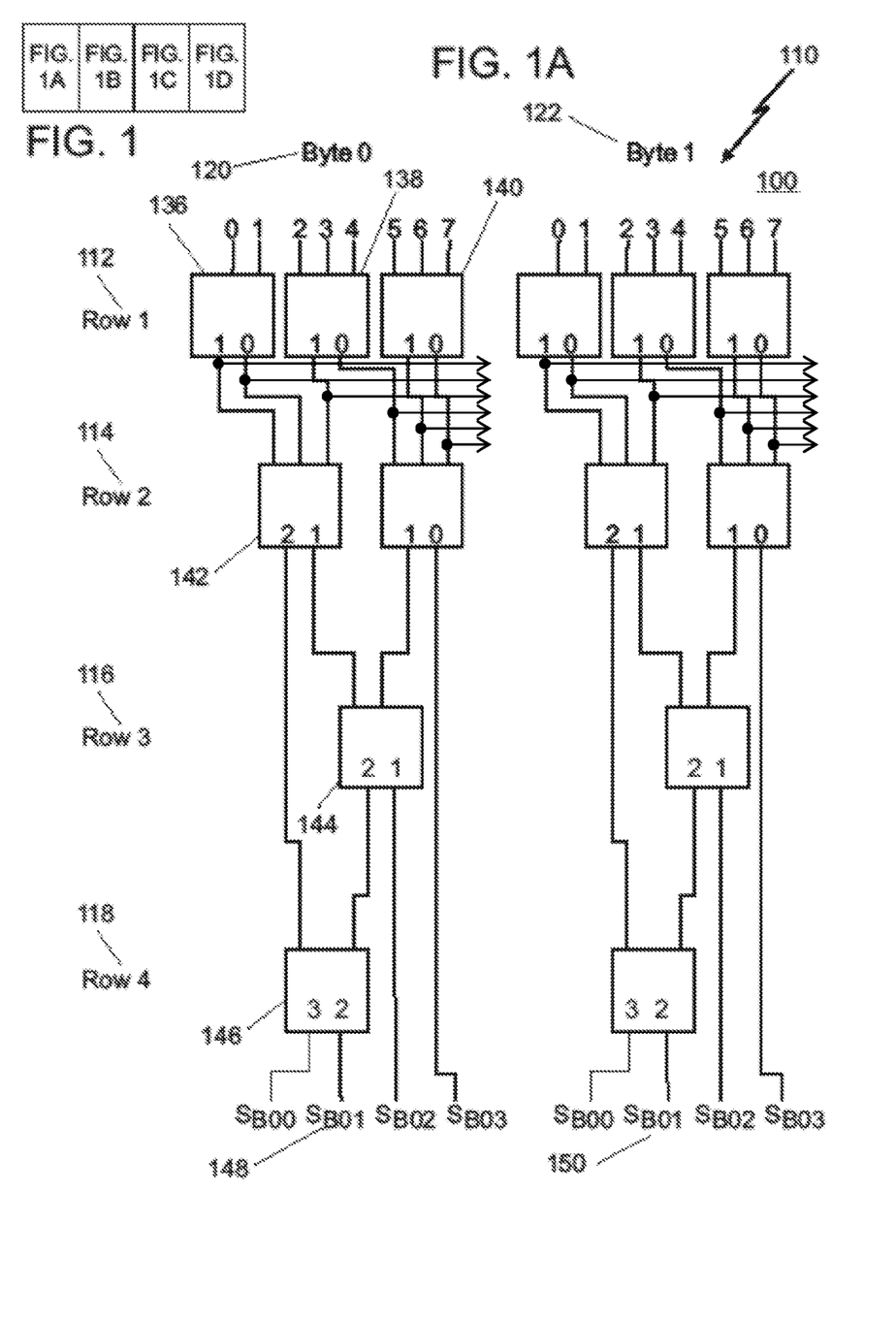
Figure 1B:
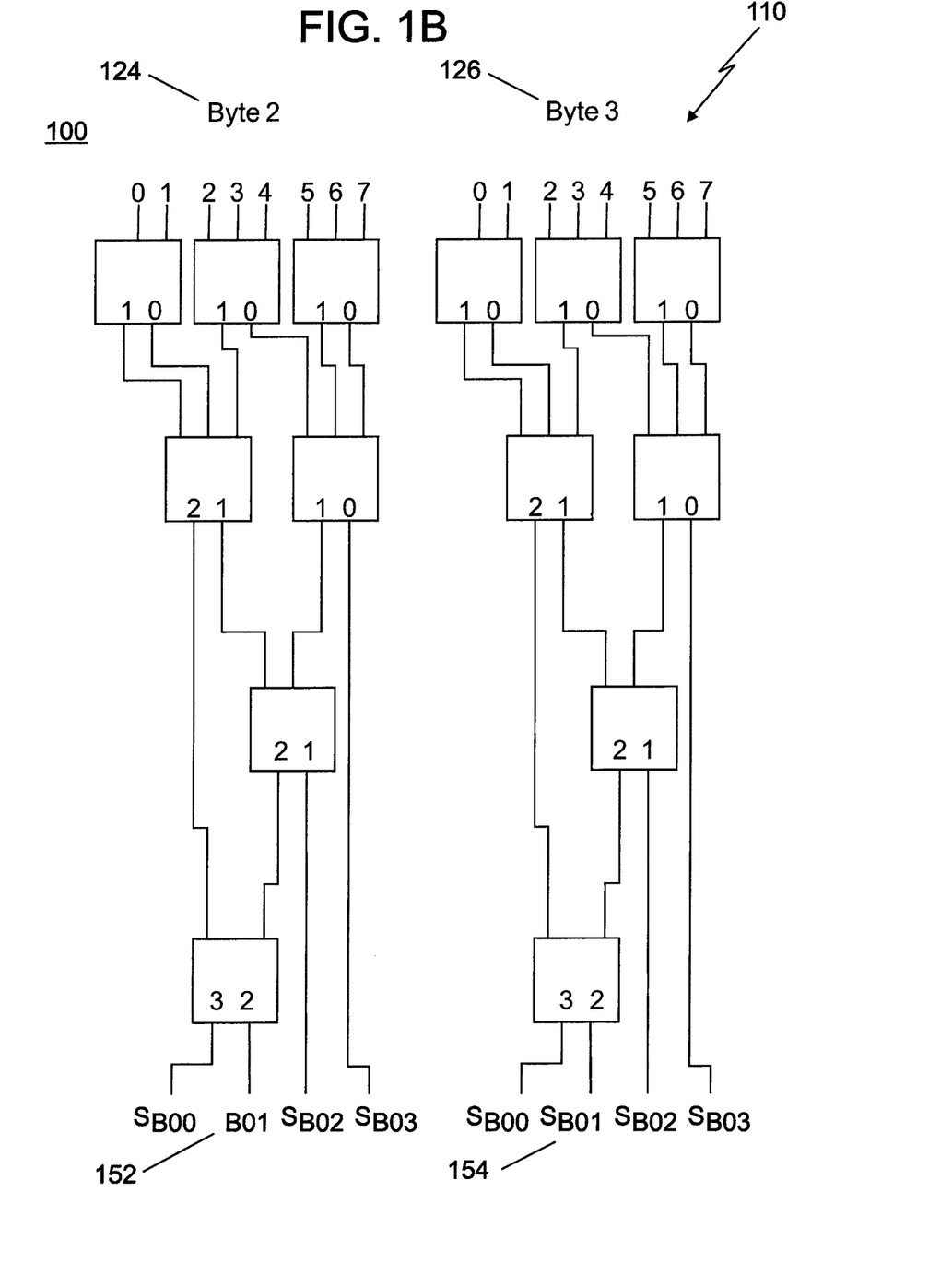
Figure 1C:
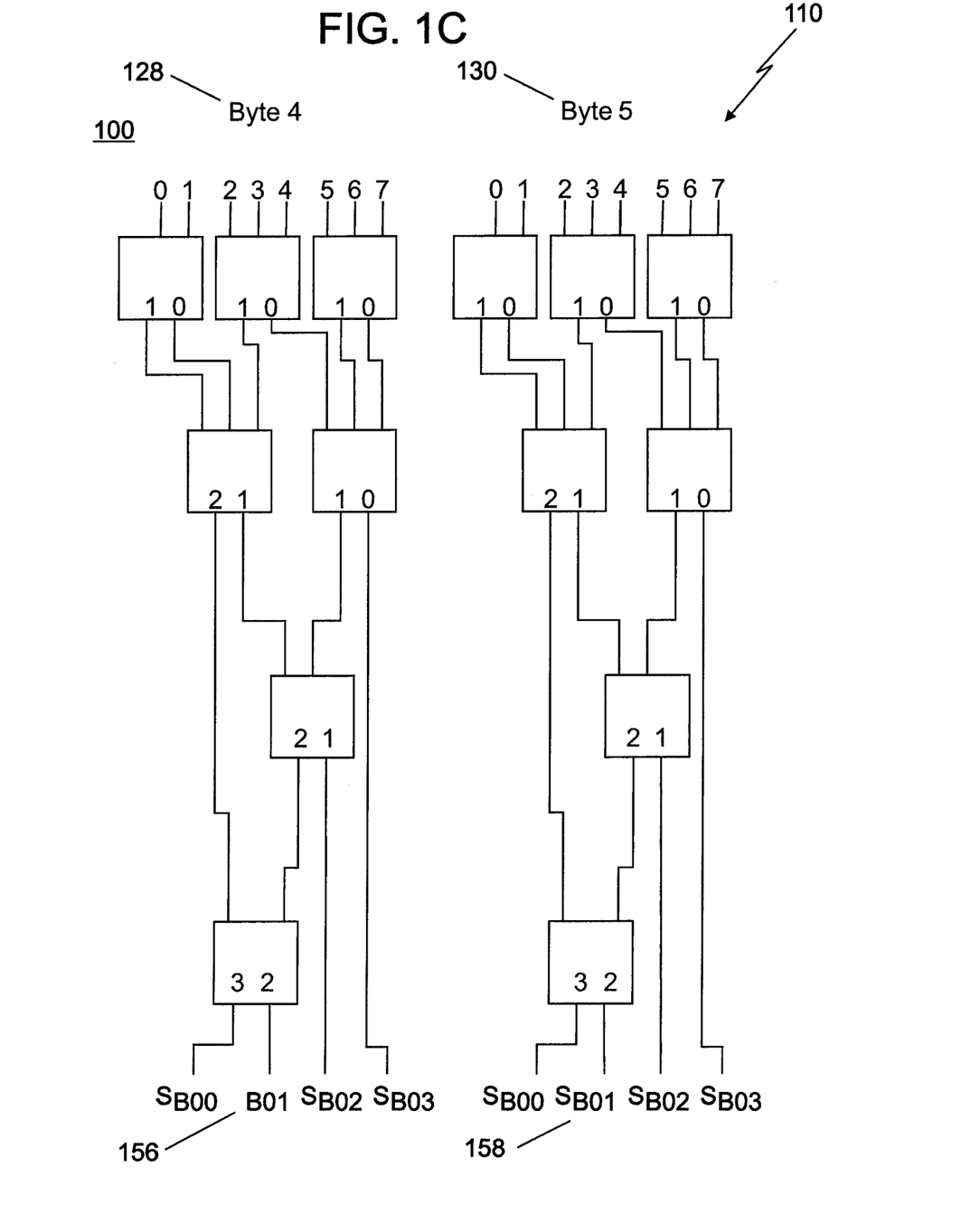
Figure 1D:
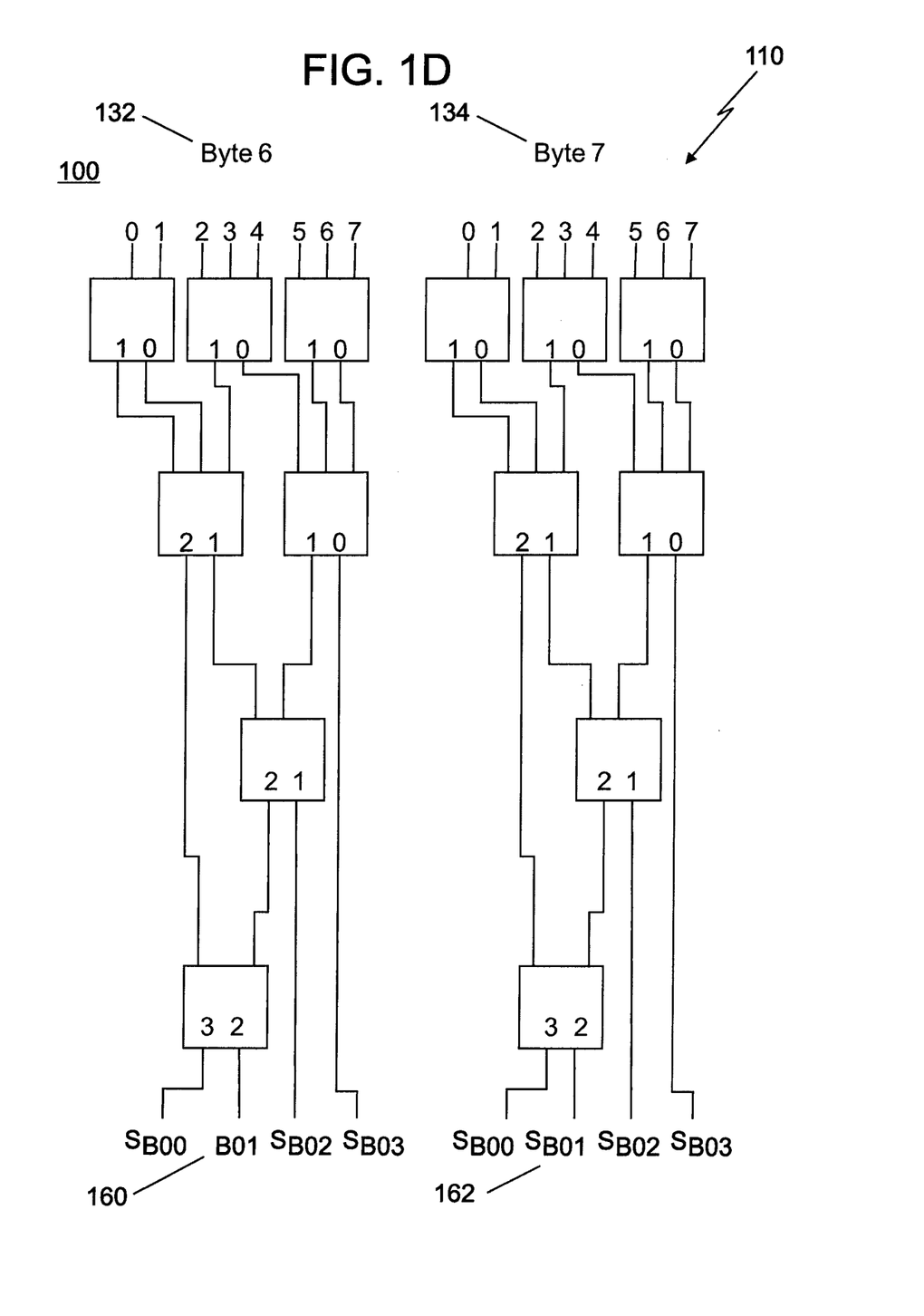
Figures 2, 2E:
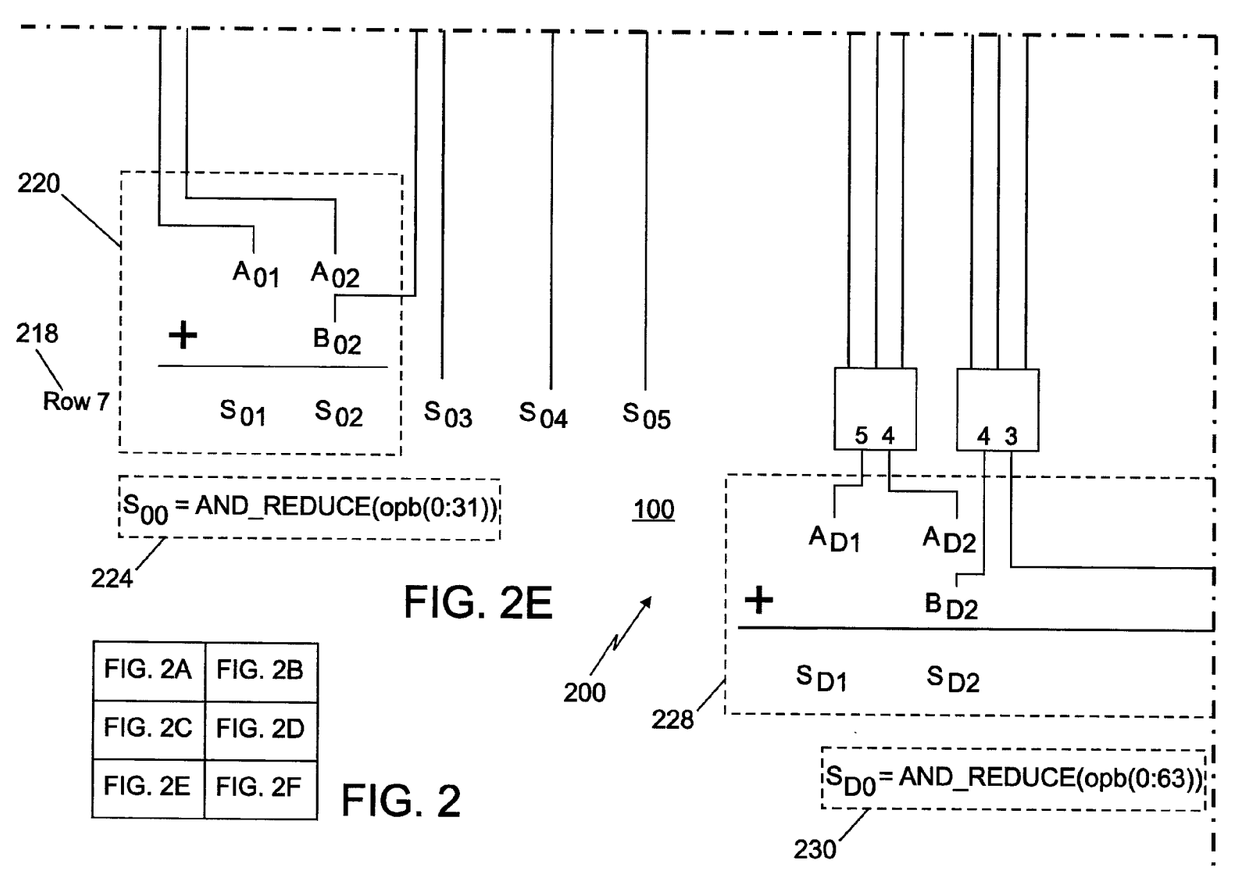
Figure 2A:
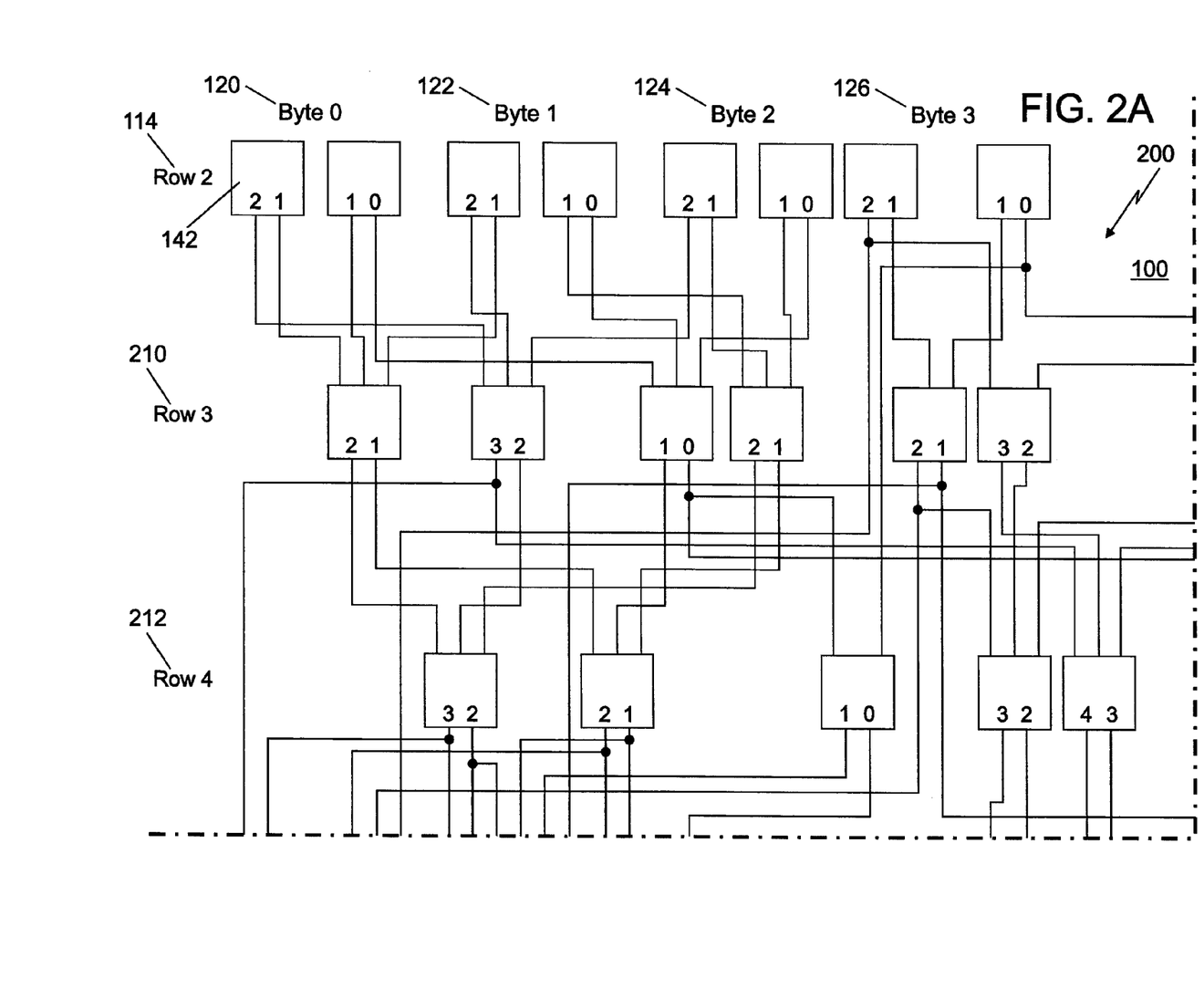
Figure 2B:
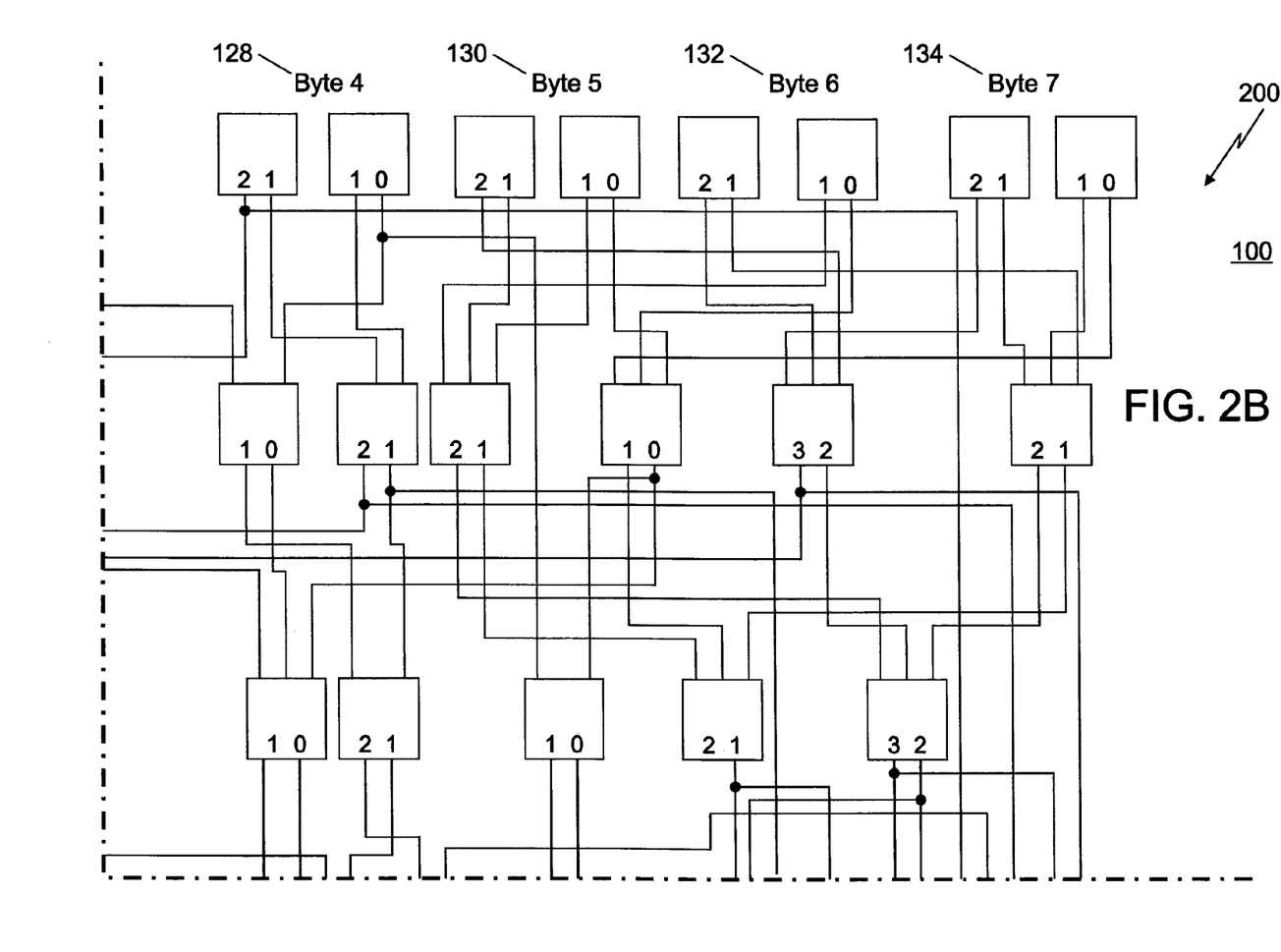
Figure 2C:
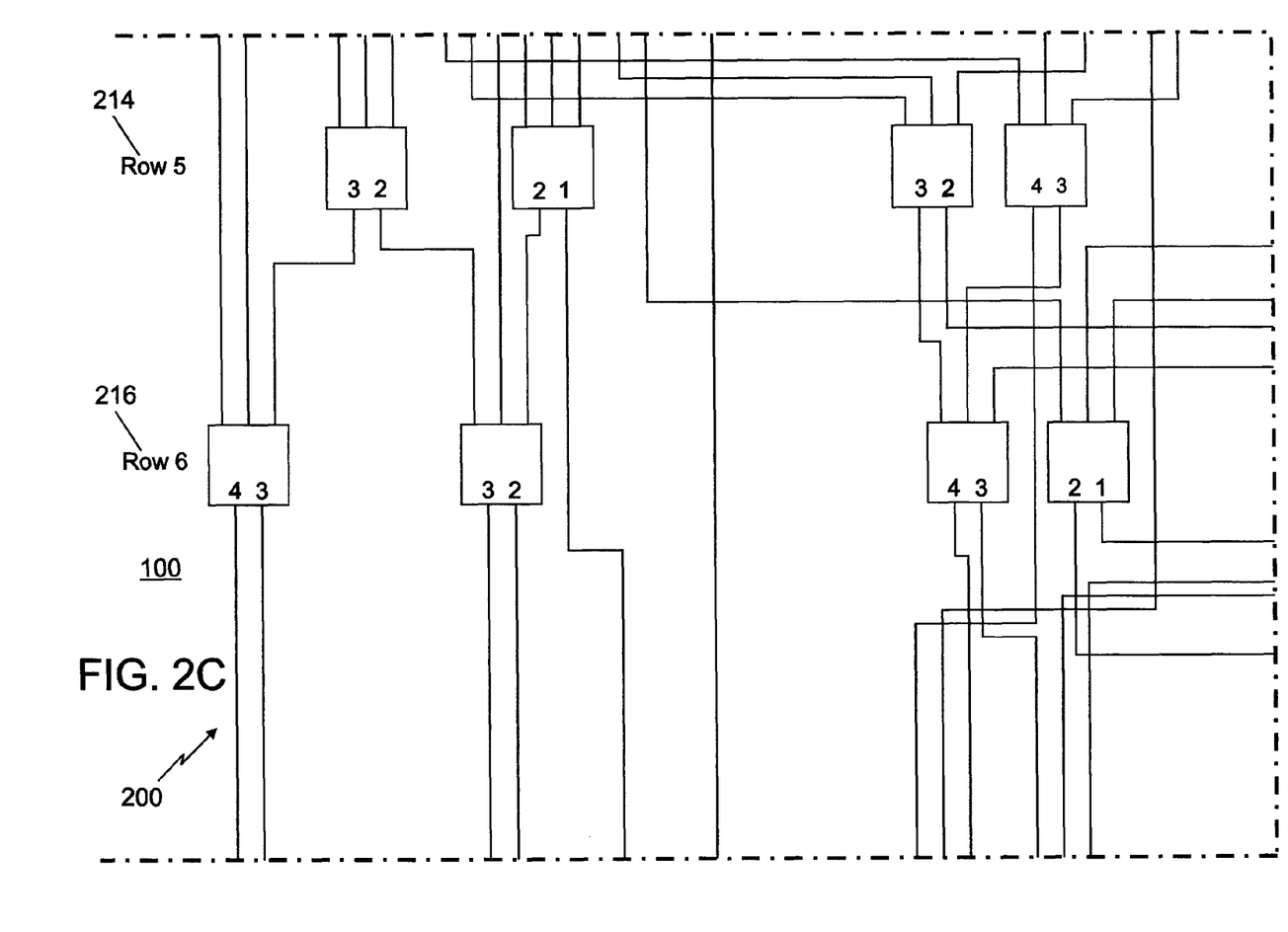
Figure 2D:
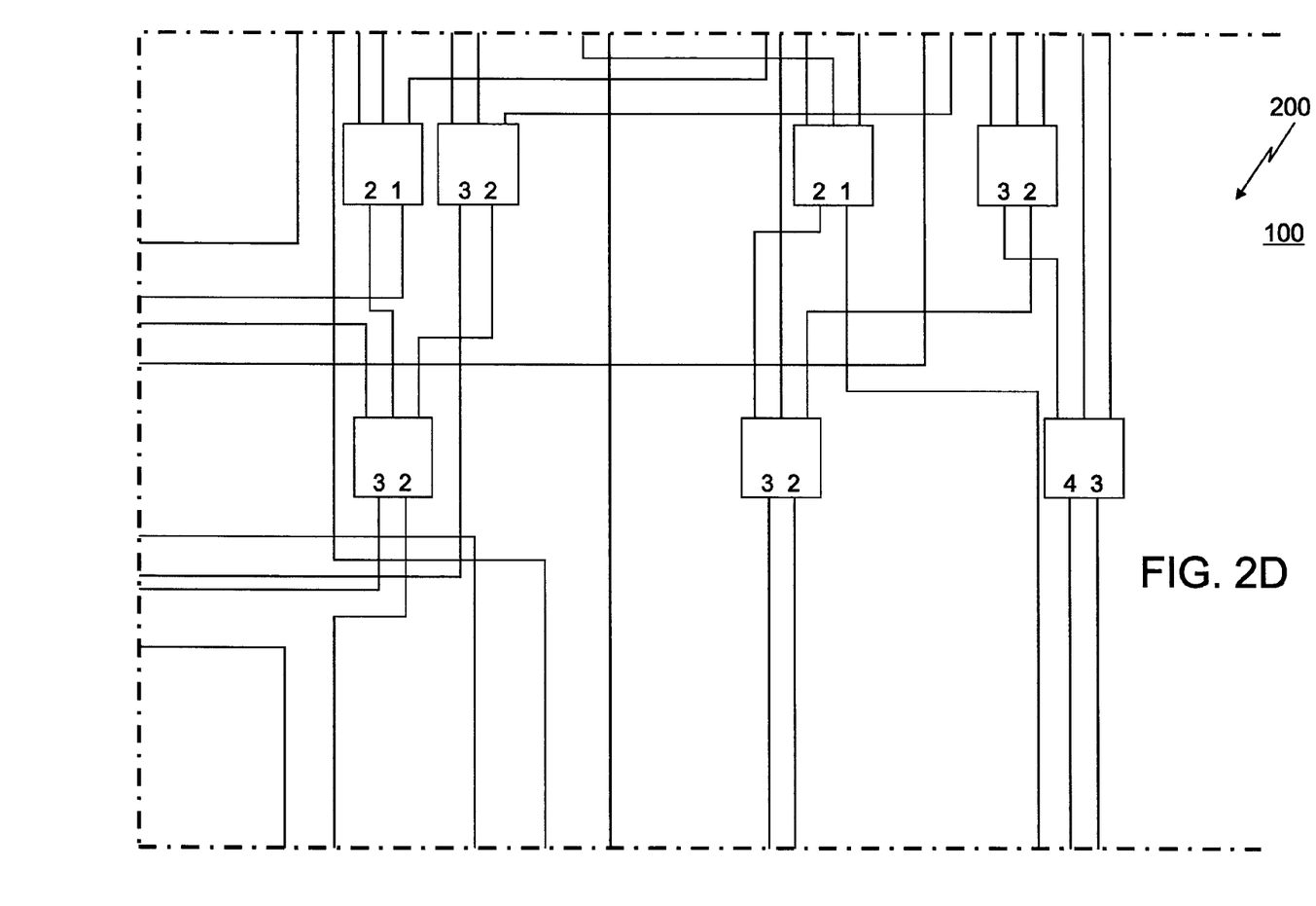
Figure 2F:
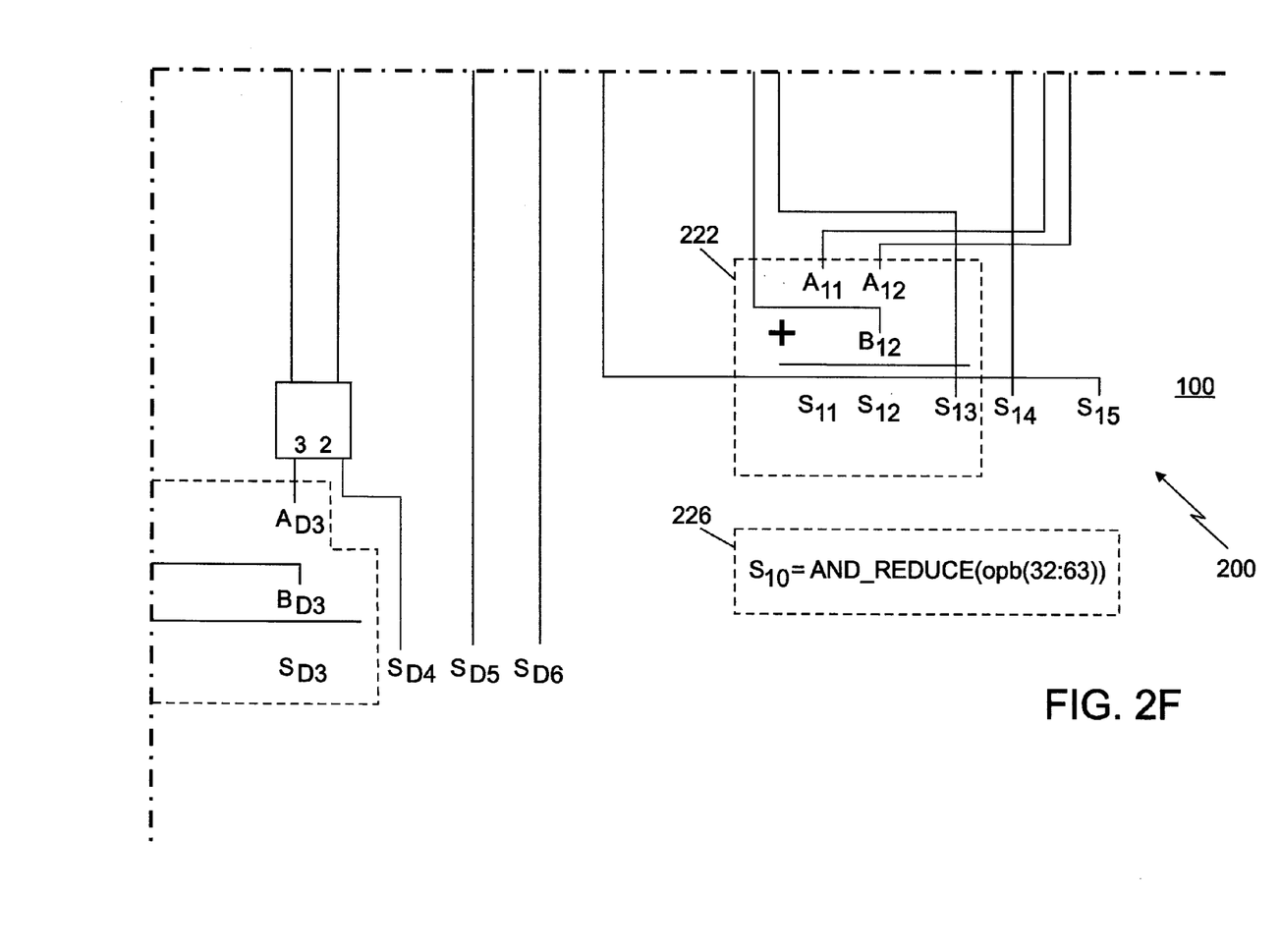

Referring together to FIGS. 1 and 2, there is shown a block diagram of an exemplary embodiment of a single, shared parallel adder tree 100 for executing multiple different population count operations or instructions for counting the number of ones in a particular, single datum. In the exemplary embodiment, the tree 100 is "shared" to simultaneously execute three separate population count instructions or operations in the PowerPC computers: (1) a "popcntb" instruction which counts the number of ones in each byte of a 64-bit doubleword and returns eight, 4-bit sums, each sum having a value in the range of 0-8; (2) a "popcntd" instruction which counts the number of ones in the 64-bit doubleword and returns one, 7-bit sum having a value in the range of 0-64; and (3) a "popcntw" instruction which counts the number of ones in each 32-bit word of a 64-bit doubleword and returns two, 6-bit sums, each sum having a value in the range of 0-32.

The preferred exemplary embodiment of the shared parallel adder tree 100 includes a number of half adders (HAs). Each half adder has two input bits (illustrated in FIGS. 1 and 2 as entering the HA from the top) and two output bits (illustrated as exiting the HA from the bottom). A first one of the output bits (i.e., the right-most bit) has a decimal value of $2^m$, while the second output bit (i.e., the left-most bit) has a decimal value of $2^{m+1}$. Also, the preferred exemplary embodiment of the shared parallel adder tree includes a number of carry-save adders (CSAs). Each CSA has three input bits (illustrated as entering the CSA from the top) and two output bits (illustrated as exiting the CSA from the bottom). A first one of the output bits (i.e., the right-most bit) has a decimal value of $2^m$, while the second output bit (i.e., the left-most bit) has a decimal value of $2^{m+1}$. Thus, as illustrated in the shared parallel adder tree 100 of FIGS. 1 and 2, the numerals indicated at the outputs of the HAs and the CSAs throughout the tree 100 represent the number "m" (i.e., the exponent which defines the particular weighted decimal output value of that HA or CSA—for example, a "3" at a left-most output of a CSA indicates that "m" equals 2 and the output is $2^3$ or 8).

Referring to FIG. 1, there illustrated is a block diagram of a first portion 110 of the tree 100. This portion 110 of the tree 100 is dedicated to executing the legacy "popcntb" instruction in the PowerPC computer, which counts the number of ones in each byte of a 64-bit doubleword and returns eight, 4-bit sums, each sum having a value in the range of 0-8. As illustrated, this portion 110 of the tree 100 includes four separate rows 112-118 {Row 1, Row 2, Row 3, Row 4} of CSAs and/or HAs. The 64-bit doubleword or operand or "datum" is applied in eight separate 8-bit bytes 120-134 {Byte 0, Byte 1, Byte 2, Byte 3, Byte 4, Byte 5, Byte 6, Byte 7} to Row 1 112 which includes, for each byte 120-134, an identical arrangement of an HA 136 and two CSAs 138-140. Bits 0 and 1 of each byte 120-134 are applied to the HA 136. Bits 2-4 of each byte 120-134 are applied to one of the CSAs 138, while bits 5-7 are applied to another one of the CSAs 140. The HAs 136 and the CSAs 138-140 of Row 1 112 propagate a partial sum of the number of ones in the 64-bit doubleword to their respective outputs.

Row 2 114 includes a number of CSAs 142 into which the outputs from the HAs 136 and the CSAs 138-140 of Row 1 112 are applied, as illustrated in FIG. 1. Thus, the CSAs 142 of Row 2 114 propagate a further partial sum of the number of ones in the 64-bit doubleword to their respective outputs. Row 3 116 includes a number of HAs 144 into which certain outputs from the CSAs 142 of Row 2 114 are applied, as illustrated in FIG. 1. As such, the HAs 144 propagate a further partial sum of the number of ones in the 64-bit double word to their respective outputs. Finally, Row 4 includes a number of HAs 146 into which certain outputs from the HAs 144 of Row 3 114 are applied, as illustrated in FIG. 1. The output of this portion 110 of the shared parallel adder tree 100 of the present invention is composed of eight, 4-bit sums 148-162, with each sum 148-162 being indicated in FIG. 1 by $\{S_{B00}, S_{B01}, S_{B02}, S_{B03}\}$, and where each sum 148-162 having a value in the range of 0-8. Thus, the first portion 110 of the shared parallel adder tree 100 of the present invention counts the number of ones in each 8-bit byte 120-134 of a 64-bit doubleword and returns eight, 4-bit sums 148-162, where each sum 148-162 represents the number of ones in each corresponding byte 120-134. That is, the first portion 110 of the tree 100 illustrated in FIG. 1 can be consider to be dedicated to executing a single, specific population count operation.

Referring to FIG. 2, there illustrated is a block diagram of a second portion 200 of the shared parallel adder tree 100 of the exemplary embodiment of the present invention. This portion 200 of the shared tree 100 executes two separate PowerPC instructions: (1) a "popcntd" instruction which counts the number of ones in the 64-bit doubleword and returns one, 7-bit sum having a value in the range of 0-64; and (2) a "popcntw" instruction which counts the number of ones in each 32-bit word of a 64-bit doubleword and returns two, 6-bit sums, each sum having a value in the range of 0-32. These two instructions are executed simultaneously with the execution of the "popcntb" instruction by the first portion 110 of the tree 100, as described in detail hereinabove with respect to FIG. 1. That is, this exemplary embodiment of the shared parallel adder tree 100 of the present invention simultaneously executes three separate, specific population count operations starting with a single datum—13 the 64-bit double word.

In FIG. 2, Row 1 112 is not illustrated for clarity. Nevertheless, the 64-bit doubleword is applied to Row 1 and the partial sum of the number of ones from Row 1 is applied to the inputs of the CSAs 142 in Row 2 114, which is illustrated in FIG. 2. That is, Row 2 114 is the same row in both FIGS. 1 and 2. Where the second portion 200 of the shared parallel adder tree 100 of the present invention differs between FIGS. 1 and 2 begins at the outputs of Row 2 114. Also, Rows 3-7 210-218 in FIG. 2 differ from Rows 3-4 116-118 in FIG. 1 in their composition of HAs and CSAs, and also in the inclusion of the additional Rows 5-7.

Essentially, the second portion 200 of the tree 100 of the present invention utilizes a "sharing" of the outputs of some of the HAs and CSAs from Rows 2-4 114, 210-212 in FIG. 2, and thus a sharing of the certain partial sums of the number of ones at the outputs of the HAs and CSAs in these Rows 2-4 114, 210-212. Other outputs from the HAs and CSAs in Rows 2-4 114, 210-212 are dedicated to the execution of only either the "popcntd" or "popcntw" instruction. Further, in FIG. 2 the two left-most CSAs and the two right-most CSAs in Row 5 214 are dedicated to the "popcntw" instruction, while the middle four CSAs in Row 5 214 are dedicated to the "popcntd" instruction. Also, in Row 6 216, the two left-most CSAs and the two right-most CSAs in FIG. 2 are dedicated to the "popcntw" instruction, while the middle three CSAs in Row 6 216 are dedicated to the "popcntd" instruction.

In Row 7 218 in FIG. 2, a carry-propagate adder (CPA) 220 is illustrated on the left-hand side of FIG. 2 to provide, at the output of the CPA 220, a portion of the sum of the number of ones in the high order 32-bits of the 64-bit doubleword applied initially to the inputs in Row 1 112. That is, the CPA 220 provides the bits $S_{O1}$ and $S_{O2}$ of the high order 32-bit word, while bit $S_{O3}$ is an output of a CSA in Row 6 216, bit $S_{O4}$ is an output of a CSA in Row 5 214, and bit $S_{O5}$ is an output of a HA in Row 4 212. The highest order bit, $S_{O0}$, in the high order 32-bit word portion of the 64-bit doubleword is provided, in a further aspect of the present invention, by an "AND" operation 224 of the highest order 32 bits in the original datum. This "sum-bit-set" detection operation reduces the delay of the CPA used to generate the final sum of the number of ones. The CPA delay is reduced in this manner by one carry stage. The result is one of the 6-bit sums as part of the output of the execution of the "popcntw" instruction.

Similarly, in Row 7 218 in FIG. 2, a CPA 222 is illustrated on the right-hand side of FIG. 2, which provides at its output a portion of the sum of the number of ones in the low order 32-bits of the 64-bit doubleword. The CPA 222 provides the bits $S_{11}$ and $S_{12}$ of the low order 32-bit word, while bit $S_{13}$ is an output of a CSA in Row 6 216, bit $S_{14}$ is an output of a CSA in Row 5 214, and bit $S_{15}$ is an output of a HA in Row 4 212. Also, the highest order bit, $S_{10}$, in the low order 32-bit word portion of the 64-bit doubleword is provided by an AND operation 226 of the lowest order 32 bits in the original datum. Therefore, the two CPAs 220-222, together with the other bits noted above from within the second portion 200 of the shared tree 100 and the bits generated by the AND operations 224-226, complete the execution of the "popcntw" instruction. The result is another one of the 6-bit sums as part of the output of the execution of the "popcntw" instruction.

In the center portion of Row 7 218 in FIG. 2 are two CSAs and an HA. The outputs of the CSAs are input to a CPA that provides the bits $S_{D1}$, $S_{D2}$, and $S_{D3}$ of the 7-bit sum as part of the execution of the "popcntd" instruction. Bit $S_{D4}$ is an output of the HA, bit $S_{D5}$ is an output of a CSA in Row 6 216, and bit $S_{D6}$ is an output of a CSA in Row 4 212. The highest order bit, bit $S_{D0}$, of the resulting 7-bit sum of the "popcntd" instruction is generated by an AND operation 230 of all 64 bits in the 64-bit doubleword.

Thus, as can be seen from the foregoing, the shared parallel adder tree 100 of the present invention utilizes certain partial sums of the number of ones generated within the tree 100 solely for a single, specific population count operation, while the tree 100 utilizes other certain partial sums of the number of ones in a shared manner among two or more specific population count operations.

The exemplary embodiment of the shared parallel adder tree for multiple different population count operations has been described and illustrated as comprising 3:2 CSAs and HAs. However, other CSAs, counters or adders may be utilized (for example, 4:2 or 7:3 CSAs) in light of the teachings herein. Also, the CPAs may be replaced with additional CSA stages. As such, the layout of the resulting parallel adder tree may be relatively more "regular", however, the delay may be somewhat longer. In addition, while the exemplary embodiment of the present invention has been described and illustrated herein for use with three specific computer (e.g., PowerPC) population count instructions, the shared parallel adder tree may be utilized for executing other computer population count instructions; for example, a 4 by 16-bit population count, and other numbers of population count operations besides three. In fact, the shared parallel adder tree 100 of the present invention may be generalized to operations that comprise counting the number of ones within N, 2×N/2, 4×N/4, . . . P×N/P bit structures using $\log_2$ N levels of CSAs.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A parallel adder tree for counting the number of ones in a datum in two or more separate population count operations, comprising:
    a plurality of first adder devices included in a first portion of the parallel adder tree that count the number of ones in the datum and that provide a first partial sum of the number of ones in the datum; and
    a plurality of second adder devices that utilize the first partial sum to count the number of ones in the datum, that provide a plurality of additional partial sums of the number of ones in the datum, and that provide a final sum of the number of ones in the datum for each one of the two or more separate population count operations such that the two or more separate population count operations are performed simultaneously, the plurality of second adder devices including a first plurality of second adder devices included in the first portion of the parallel adder tree and a second plurality of second adder devices included in a second portion of the parallel adder tree different from the first portion;
    wherein certain ones of the plurality of first adder devices and the first plurality of second adder devices of the first portion are dedicated to provide a certain one or more of the plurality of additional partial sums, and to provide a first final sum of the number of ones in the datum for at least one of the two or more separate population count operations without being shared with the second portion and without further input to additional adders; and
    wherein certain ones of the plurality of first adder devices included with the first portion of the parallel adder tree are shared with the second plurality of second adder devices included in the second portion of the parallel adder tree to provide a certain one or more of the plurality of additional partial sums and to provide a second final sum for another at least one of the two or more separate population count operations without being further input to additional adders, the second final sum having a value that is a multiple with respect to the value of bits of the first final sum.

2. The parallel adder tree of claim 1, wherein the adder devices include one or more carry-save adders, and wherein at least one first carry-save adder included in the second portion of the parallel adder tree receives partial sums having a common first binary weight and at least one second carry-save adder included in the second portion receives partial sums having a common second binary weight different from the common first binary weight, the common first binary weight output from a first byte column of a first row located in the second portion of the parallel adder tree, and the common second binary weight output from a second byte column different from the first byte column in the second portion, the second byte column included in the first row of the second portion of the parallel adder tree.

3. The parallel adder tree of claim 2, wherein the carry-save adders include those from the group comprising 3:2 carry-save adders, 4:2 carry-save adders, and 7:3 carry-save adders.

4. The parallel adder tree of claim 1, wherein the adder devices include half adders.

5. The parallel adder tree of claim 1, wherein the adder devices include a carry-propagate adder that provides at least a portion of the final sum for one of the one or more separate population count operations.

6. The parallel adder tree of claim 1, wherein the adder devices include an AND device for providing a certain bit within the final sum for at least one of the one or more separate population count operations.

7. The parallel adder tree of claim 1, wherein the first plurality of adder devices are arranged in one or more rows, and wherein the second plurality of adder devices are arranged in one or more rows.

8. The parallel adder tree of claim 1, wherein the datum comprises N number of bits, and wherein a first one of the two or more separate population count operations includes counting the number of ones in the N-bit datum.

9. The parallel adder tree of claim 1, wherein a second one of the two or more separate population count operations includes counting the number of ones within two times N/2 number of words within the N-bit datum.

10. The parallel adder tree of claim 1, wherein a third one of the two or more separate population count operations includes counting the number of ones within four times N/4 number of words within the N-bit datum.

11. The parallel adder tree of claim 1, wherein a fourth one of the two or more separate population count operations includes counting the number of ones within eight times N/8 number of words within the N-bit datum.

12. A parallel adder tree for counting the number of ones in a datum in a plurality of separate population count operations executing simultaneously, comprising:
   a plurality of first adders included in a first portion of the parallel adder tree that count the number of ones in the datum and that provide a first partial sum of the number of ones in the datum, wherein the first plurality of adders are arranged in one or more rows; and
   a plurality of second adders that receive the first partial sum, that provide a plurality of additional partial sums of the number of ones in the datum, and that provide a final sum of the number of ones in the datum for each one of the plurality of separate population count operations, wherein the plurality of second adders are arranged in a plurality of rows, the plurality of second adder devices including a first plurality of second adder devices included in the first portion of the parallel adder tree and a second plurality of second adder devices included in a second portion of the parallel adder tree different from the first portion such that the separate population count operations are performed simultaneously;
   wherein certain ones of the first and second plurality of adders of the first portion are dedicated to provide a certain one or more of the plurality of additional partial sums, and to provide a first final sum of the number of ones in the datum for one of the plurality of separate population count operations without being shared with the second portion and further input to additional adders; and
   wherein certain ones of the plurality of first adders included with the first portion of the parallel adder tree are shared with the second plurality of second adder devices included in the second portion of the parallel adder tree to provide a certain one or more of the plurality of additional partial sums, and to provide a second final sum for another one or more of the plurality of separate population count operations without being further input to additional adders, the second final sum having a value of bits that is a multiple with respect to a value of bits of the first final sum.

13. The parallel adder tree of claim 12, wherein the adders include carry-save adders and half adders.

14. The parallel adder tree of claim 13, wherein the carry-save adders include those from the group comprising 3:2 carry-save adders, 4:2 carry-save adders, and 7:3 carry-save adders.

15. The parallel adder tree of claim 12, wherein the adders include a carry-propagate adder that provides at least a portion of the final sum for at least a corresponding one of the plurality of separate population count operations.

16. The parallel adder tree of claim 12, wherein the adder devices include an AND device for providing a certain bit within the final sum for one of the one or more separate population count operations.

17. The parallel adder tree of claim 12, wherein the datum comprises N number of bits, wherein a first one of the plurality of separate population count operations includes counting the number of ones in the N-bit datum, wherein a second one of the plurality of separate population count operations includes counting the number of ones within 2 times N/2 number of words within the N-bit datum, wherein a third one of the plurality of separate population count operations includes counting the number of ones within 4 times N/4 number of words within the N-bit datum, and wherein a fourth one of the plurality of separate population count operations includes counting the number of ones within 8 times N/8 number of words within the N-bit datum.

18. A shared parallel adder tree for counting the number of ones in a datum in a plurality of separate population count operations executing simultaneously, wherein the plurality of operations includes counting the number of ones in two or more of N, 2 times N/2, 4 times N/4 . . . P times N/P bit structures, the shared parallel adder tree comprising:
   a plurality of first adders included in a first portion of the parallel adder tree that count the number of ones in the datum and that provide a first partial sum of the number of ones in the datum, wherein the first plurality of adders are arranged in one or more rows; and a plurality of second adders that receive the first partial sum, that provide a plurality of additional partial sums of the number of ones in the datum, and that provide at least a portion of a final sum of the number of ones in the datum for each one of the plurality of separate population count operations such that the plurality of separate population count operations are performed simultaneously,
   wherein the plurality of second adders are arranged in a plurality of rows, wherein the plurality of second adders include a plurality of carry-propagate adders that each provides at least another portion of the final sum for at least a corresponding one of the plurality of separate population count operations, wherein the plurality of first and second adders include carry-save adders and/or half adders;
   wherein certain ones of the plurality of first and second adders of the first portion are dedicated to provide a certain one or more of the plurality of additional partial sums, and to provide the at least a portion of a first final sum of the number of ones in the datum for one of the plurality of separate population count operations without being shared with the second portion and further input to additional adders, the plurality of second adders including a first plurality of second adder devices included in the first portion of the parallel adder tree and a second plurality of second adder devices included in a second portion of the parallel adder tree different from the first portion; and
   wherein certain ones of plurality of first adders included in the first portion of the parallel adder tree are shared with the second plurality of second adder devices included in the second portion of the parallel adder tree to provide a certain one or more of the plurality of additional partial sums, and to provide at least a portion of a second final sum for another one or more of the plurality of separate population count operations without being further input to additional adders, the second final sum having a value of bits that is a multiple with respect to a value of bits of the first final sum.

19. The parallel adder tree of claim 18, wherein the second plurality of adders include an AND device, wherein each AND device provides a certain bit within the final sum for each one of the plurality of separate population count operations.

* * * * *